United States Patent [19]

Fillmore et al.

[11] Patent Number: 4,459,862

[45] Date of Patent: Jul. 17, 1984

[54] CLAMP AND METHOD ENABLING TIGHTNESS CHECK

[75] Inventors: Francis L. Fillmore, Birmingham; David Wampler, Jr., Warren; Theodore H. Collins, Troy, all of Mich.

[73] Assignee: GKN Automotive Components, Inc., Southfield, Mich.

[21] Appl. No.: 409,242

[22] Filed: Aug. 18, 1982

[51] Int. Cl.³ .............................................. G01L 5/00
[52] U.S. Cl. ............................ 73/862.01; 24/20 CW; 285/93
[58] Field of Search ................ 73/432 V, 847, 862.01, 73/862.02, 862.19, 862.32, 862.54; 138/107; 24/19, 20 R, 20 CW, 20 TT; 285/39, 93

[56] References Cited

U.S. PATENT DOCUMENTS

| 2,804,095 | 8/1957 | Schauenburg | 138/107 |
| 3,572,105 | 3/1971 | Kaehler | 73/862.02 |
| 4,222,155 | 9/1980 | Oetiker | 24/20 R |
| 4,299,012 | 11/1981 | Oetiker | 24/19 |

FOREIGN PATENT DOCUMENTS 0699295 12/1964 Canada ........................... 73/862.02

OTHER PUBLICATIONS

Torque Manual, (7th Ed.), P. A. Sturtevant Co., 1965, pp. 26 and 32.

Primary Examiner—Charles A. Ruehl
Attorney, Agent, or Firm—Remy J. VanOphem

[57] ABSTRACT

A clamp and method enabling the tightness established by a clamp connection to be checked after installation. The clamp consisting of a band member formed with diametrically opposite eyelets which are engageable with a spanner tool, which in turn is engagable with a torque wrench to enable the tightness of the clamped connection to be checked by applying a torque sufficient to just slip.

8 Claims, 3 Drawing Figures

U.S. Patent    Jul. 17, 1984    4,459,862
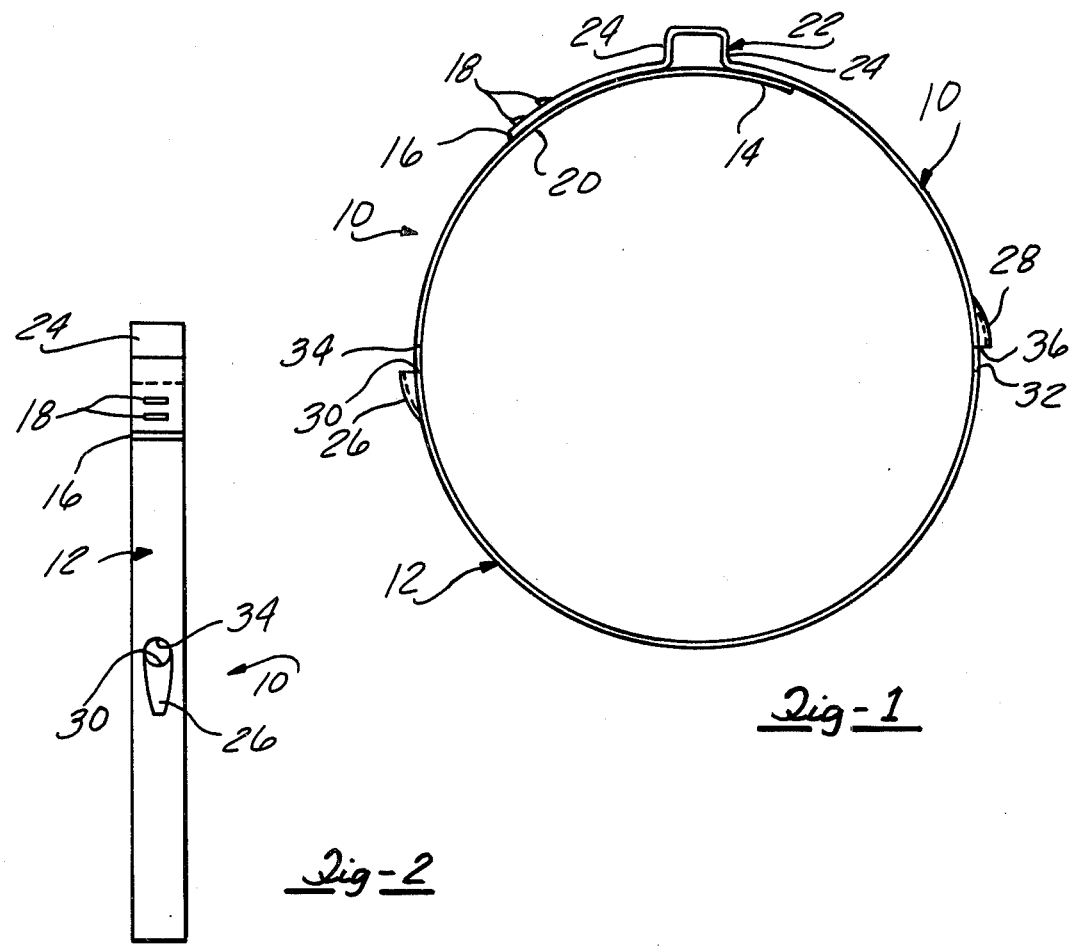
Fig-1
Fig-2
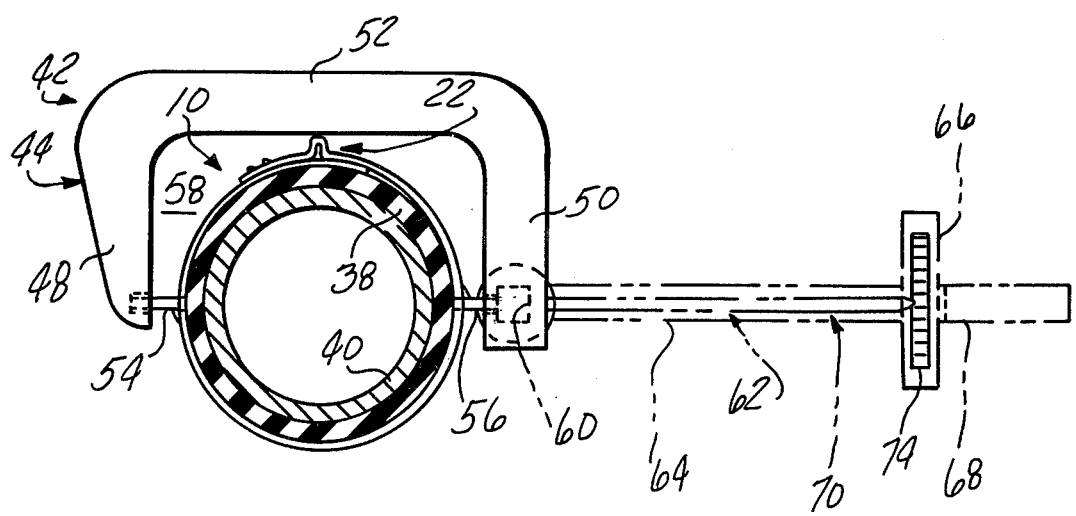
Fig-3

CLAMP AND METHOD ENABLING TIGHTNESS CHECK

BACKGROUND OF THE INVENTION

This invention concerns clamped connections and more particularly clamp configurations and methods enabling a check of the tightness of the clamped connection after installation.

Encircling band type clamps are often employed in clamping hoses or rubber seals to pipes, rods, etc., in which an encircling band member is tightened to produce a radial compression of the clamped element to thereby establish a secure connection. It often happens that the tightening of the encircling band member does not produce a sufficient retention force acting on the joint, due to various factors adversely affecting the joint tightness. These factors may include improper installation of the clamp tightening elements; loosening of the clamp after assembly; or the presence of grease or other lubricating material at the clamp area reducing the tightness of the joint below minimum standards for the particular application.

This is particularly a problem in clamp designs where the tightening of the encircling band is achieved by simple mechanical deformation of portions of the band and which affords only limited tightening such that it is difficult to determine the degree of tightness achieved by the band deformation.

A common clamp design includes an encircling band of steel having its ends overlapped and secured together with a protruding ear portion forming a small loop extending radially outwardly at a point along the periphery of one end of the band member. Compressive deformation of the ear portion reduces the circumference of the band to thereby achieve clamp tightening. This design offers the advantages of simplicity, low cost and ease of installation. Additionally, it would be highly desirable if some readily implemented method for auditing or testing of the clamp connection after installation were possible. Such method should be desirably achieved without necessitating a complex configuration of the clamp itself. Such method should further be able to be implemented with relatively simple equipment and not be subject to inaccuracy due to delicacy of the test equipment. Furthermore, such method should be able to be implemented without the need for highly skilled personnel and with a high degree of reliability in the test results.

It is therefore an object of the present invention to provide a method and clamp for conducting an audit of the clamp tightness after installation thereof.

It is a further object of the present invention to provide such method and clamp which allows such testing with relatively simple equipment and with a high degree of reliability and results and which does not require highly skilled personnel in order to be implemented.

It is a further object of the present invention to provide such clamp which enables such clamp tightness testing without a gradual increase in the complexity or cost to manufacture the clamp itself.

SUMMARY OF THE INVENTION

These and other objects of the present invention, which will become apparent upon a reading of the following specification and claims, are achieved by the use of a clamp of the type including an encircling band member, which band member is formed with a pair of diametrically opposed protuberances or eyelets which in turn enable engagement of the clamp with a spanner tool or fixture. In this implementation of the method, the eyelets are engaged with a torque wrench such that a torque may be applied to the installed clamp until the encircling band is caused to just slip. The torque level at which this occurs may be noted on the torque wrench scale and gives a highly reliable indication of the installed tightness of the clamp while not disturbing the integrity of the clamped connection. The eyelets may be formed by an adjacent pair of holes extending into the band member with formed ears immediately adjacent thereto. The spanner tool may include adjustable, oppositely directed pins carried by a spanner body. The spanner body is formed with a socket drive, engageable with a standard torque wrench drive. The height of the eyelets is carefully controlled to produce an accurate diametric dimension such that the torque indicated at the torque wrench is precisely related to the tightness of the clamped connection.

DETAILED DESCRIPTION OF THE DRAWINGS

FIG. 1 is an end view of the band clamp according to the present invention;

FIG. 2 is a side view of the band clamp shown in FIG. 1; and

FIG. 3 is a sectional view of a clamp connection, with the band clamp of FIGS. 1 and 2 installed, and engaged with a spanner tool and torque wrench.

DETAILED DESCRIPTION OF THE PREFERRED EMBODIMENT

In the following detailed description certain specific terminology will be employed for the sake of clarity and a particular embodiment described in accordance with the requirements of 35 U.S.C. 112. It is to be understood that the same is not intended to be limiting and indeed should not be so construed inasmuch as the invention is capable of taking many forms and variations within the scope of the appended claims.

Referring to the drawings, a band clamp 10 is depicted in FIGS. 1 and 2. The band clamp 10 is of a type commonly utilized to make connections between hoses, rubber boots, or similar items and a round-in-section received member. The clamped connection is established by a tightening of an encircling metal band 12 of a suitable high strength steel. The ends 14 and 16 of the encircling metal band 12 are overlapped as seen in FIG. 1, the end 16 being secured at an intermediate point adjacent the opposite end 14 as by means of formed tabs 18 at intermediate locations received in corresponding formed openings 20 in the band end 16.

The encircling metal band 12 is formed with an ear 22 at a point adjacent to the end 16 beyond the point of connection established by the tabs 18. The ear 22 forms a loop having straight sides 24 engageable with pliers or another suitable tool. The compression of the straight sides 24 together serves to shorten the circumference of the encircling metal band 12 and establish tightening of the clamp connection. The deformation of the ear 22 provides a permanent set to maintain the clamping pressure after installation.

According to the concept of the present invention anti-rotation features are formed into the periphery of the encircling band 12 at diametrically opposite locations in order to enable engagement of a turning tool with the clamp after installation. These features include eyelets 26 and 28 formed into the periphery of the encircling metal band 12 at diametrically opposite locations, as seen in FIG. 1. The eyelets 26 and 28 consist of tear-shaped bulges extending in opposite orientations, each adjacent respective through holes 30 and 32 also formed into the band 12. This creates oppositely located shoulders 34 and 36 which are of a predetermined diametrical distance apart from each other.

In use, the band clamp 10 is installed over the connection to be secured, as for example that of a hose or boot 38 in turn received over a metal rod or pipe connection as illustrated in FIG. 3. The ends 14 and 16 are secured by insertion of the tabs 18 into the openings 20. Thereafter, the ear 22 is squeezed by a pliers and collapsed, to cause tightening of the encircling metal band 12 to complete the installation of the band clamp 10 on the joint. A turning tool is then brought into engagement with the eyelets 26 and 28.

The turning tool here takes the form of a spanner tool 42 including a generally U-shaped frame member 44 having oppositely facing legs 48 and 50 defining a space therebetween, joined with a bridging section 52. The legs 48 and 50 are provided with aligned oppositely extending pins 54 and 56 directed towards the intervening space 58 between the legs 48 and 50. The width of the space 58 is sufficiently wide to accommodate the diameter of the connection and allow each of the pins 54 and 56 to be in alignment with the holes 30 and 32 with the side surfaces thereof in engagement with the shoulders 34 and 36 respectively. The pins 54 and 56 are threadably received in the respective legs 48 and 50 such as to allow adjustment of the position of these pins to be adapted to field conditions for the particular clamped connection. The spanner tool 42 also is provided with a square drive socket opening 60 in alignment with the axis of the pins 54 and 56. The square drive socket opening 60 enables engagement of a torque wrench 62, which may be of essentially conventional design with a handle frame member 64 having a scale plate 66 affixed thereto and to which is pivotally mounted a handle 68. A pointer 70 is affixed at one end to the handle frame member 64 and the other end in juxtaposition with a scale 74. The design of such torque wrenches is such that the pointer and scale 74 cooperate to give an inch-pound or other unit determination of the turning force exerted with the pivoted handle 68, all in a well known fashion.

The alignment of the square drive socket opening 60 with the pin axis insures that the torque exerted on the band clamp 10 is accurately reflected by the pointer and scale arrangement.

Accordingly, after engagement of the spanner tool 42 with the torque wrench 62, an increasing turning force is applied via the torque wrench handle 68 until a torque level is reached sufficient to cause the clamp to just slip by empirical analysis of the particular clamp and connection characteristics. A given torque value can be assigned for minimum acceptability of tightness for the particular clamp joint, as required.

The clamped connection is not appreciably disturbed, and a rapid and reliable determination is made as to the installed tightness of the connection. The orientation of the eyelets 26 and 28 is such that the inside end 14 of the encircling metal band 12 trails as related to the direction of clamp rotation induced by the torque wrench 62 such as to eliminate any tendency of the inside edge of the end 14 to gouge the clamped member 38 to insure an accurate correlation between the turning force applied and the tightness of the clamped connection.

Accordingly, it can be appreciated that the above recited objects of the present invention have been achieved by the clamp and method as described. A relatively simple clamp configuration enables the application of the method which operates in a highly reliable fashion and does not require highly skilled test personnel or elaborate equipment. Furthermore, it allows the test to be made without appreciably disturbing the clamped connection.

Variations of the present invention are of course possible as by the provision of alternative engagement features other than the eyelets as disclosed or alternate configurations of the spanner tool means and torque wrench, as will be appreciated by those skilled in the art.

Having described the invention, what I claim is:

1. A method for checking the tightness of an installed clamp connection, said clamp connection comprising a circular member, an annular member encircling said circular member and adapted to effect a sealing relationship therewith, and a band clamp encircling said annular member, said method comprising the steps of:
    engaging said band clamp with a turning tool and applying a torque to said band clamp sufficient to cause said band clamp to just slip circumferentially relative to one of said annular member and said circular member; and
    measuring the torque required to cause said band clamp to just slip, whereby a check on said tightness is enabled.

2. The method according to claim 1 wherein said measuring step includes the step of engaging said turning tool with a torque wrench.

3. The method according to claim 2 wherein said band clamp is formed with at least two circumferentially-spaced radially-extending protrusions and wherein said engaging step of said method includes engaging at least one of said circumferentially-spaced radially-extending protrusions with said turning tool.

4. The method according to claim 3 wherein said at least two circumferentially-spaced radially-extending protrusions are diametrically opposite, said turning tool comprises diametrically-opposed adjustable engaging members, and said engaging step includes adjusting said diametrically-opposed adjustable engaging members to radially engage said at least two circumferentially-spaced radially-extending protrusions.

5. A method of checking the tightness of an installed clamp connection, said clamp connection comprising a circular member, an annular member encircling said circular member and adapted to effect a sealing relationship therewith, and a band clamp encircling said annular member, said method comprising the steps of:
    applying an increasing circumferential torque to said band clamp; and
    determining whether said band clamp slips circumferentially relative to one of said annular member and circular member before said torque exceeds a predetermined torque selected to represent a predetermined tightness.

6. The method according to claim 5 wherein said band clamp is formed with at least two circumferentially-spaced radially-extending protrusions and wherein said applying step includes the further step of engaging said at least two circumferentially-spaced radially-extending protrusions with a turning tool and said determining step further includes the step of applying torque with a torque wrench.

7. A clamp comprising:
a band adapted to encircle and effect a sealing connection between an annular member and a circular member received within said annular member, said band further comprising:

first protrusion means circumferentially deformable about said sealing connection for tightening said band at assembly about said annular member and said circular member to a tightness in excess of a predetermined tightness; and second protrusion means spaced circumferentially from said first protrusion means and adaptable after said deformation of said first protrusion means to allow the application of a predetermined circumferential torque to said sealing connection in excess of a predetermined torque selected to correspond to said predetermined tightness.

8. The clamp according to claim 7 wherein said second protrusion means comprises first and second eyelets each being raised radially outwards from respective holes formed into said band.

* * * * *